(12) United States Patent
Ueda et al.

(10) Patent No.: US 6,419,239 B1
(45) Date of Patent: Jul. 16, 2002

(54) SEALING STRUCTURE OF A JOINT FOR THREE MEMBERS

(75) Inventors: Katsunori Ueda; Yoshiyasu Takehana; Shunichi Searashi, all of Aichi (JP)

(73) Assignee: Nichias Corporation, Tokyo (JP)

( * ) Notice: Subject to any disclaimer, the term of this patent is extended or adjusted under 35 U.S.C. 154(b) by 0 days.

(21) Appl. No.: 09/469,826

(22) Filed: Dec. 22, 1999

(30) Foreign Application Priority Data

Dec. 25, 1998 (JP) .......................................... 10-370391

(51) Int. Cl.⁷ ................................................ F16J 15/02
(52) U.S. Cl. ...................................................... 277/639
(58) Field of Search ................................. 277/593, 594, 277/596, 605, 639, 645

(56) References Cited

U.S. PATENT DOCUMENTS

| | | | | |
|---|---|---|---|---|
| 3,467,398 A | * | 9/1969 | Bernard | ....................... 277/639 |
| 4,830,698 A | * | 5/1989 | DeCore et al. | ......... 277/596 X |
| 5,092,291 A | * | 3/1992 | Langlois | ................. 277/593 X |
| 5,263,444 A | * | 11/1993 | Prior et al. | ............. 277/645 X |
| 5,294,133 A | * | 3/1994 | Dutta | |
| 5,586,772 A | * | 12/1996 | Deaver | ................... 277/645 X |

FOREIGN PATENT DOCUMENTS

JP  10-231935  9/1998

* cited by examiner

*Primary Examiner*—Robert J. Sandy
*Assistant Examiner*—Karlena D. Schwing
(74) *Attorney, Agent, or Firm*—Flynn, Thiel, Boutell & Tanis, P.C.

(57) ABSTRACT

In order to improve a sealing structure of a joint for three members, in which the three members butt against each other and a joint portion has a T-shape, in the sealing structure of a joint for three members, in which the three members, i.e. a first, a second and a third member, butt against each other and a joint portion has a T-shape, at least one plate-shaped gasket, in which rubber layers are formed on two surfaces of a metal plate, is disposed between surfaces to be jointed where the second and the third member are butted against the first member. An opening is formed in the plate-shaped gasket at a portion, which is opposite to a T-shaped portion, and filled with paste-like liquid gasket sealing the T-shaped portion.

13 Claims, 6 Drawing Sheets

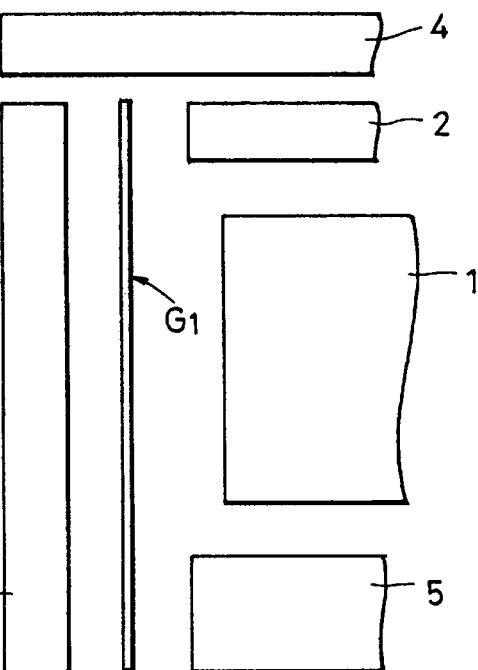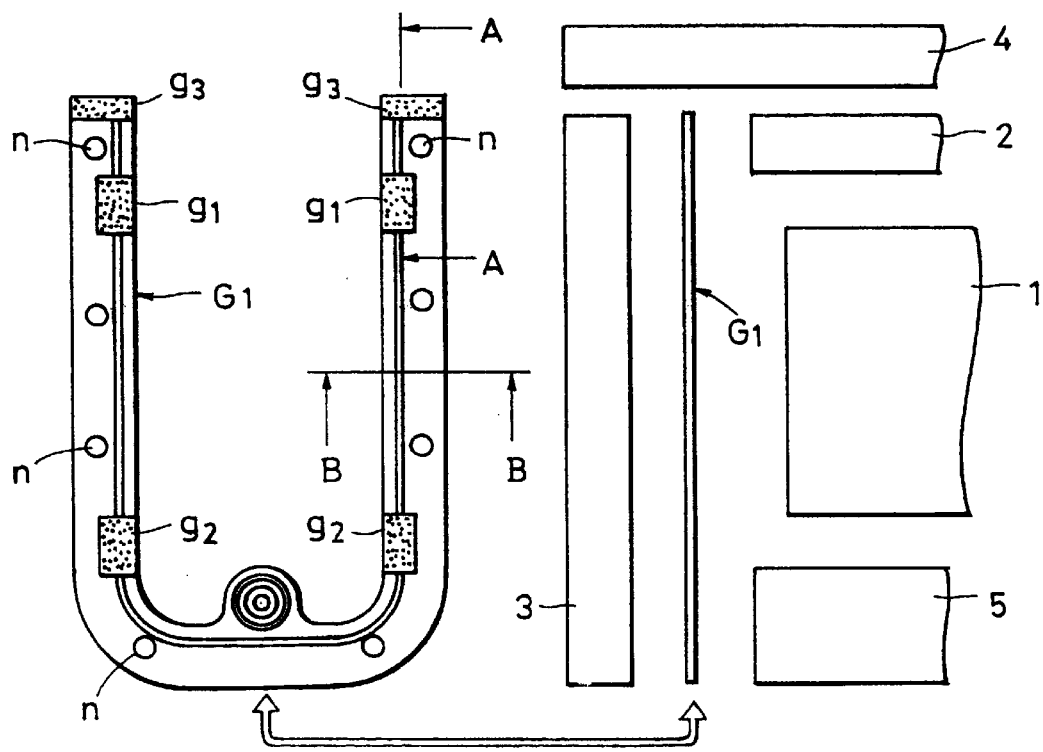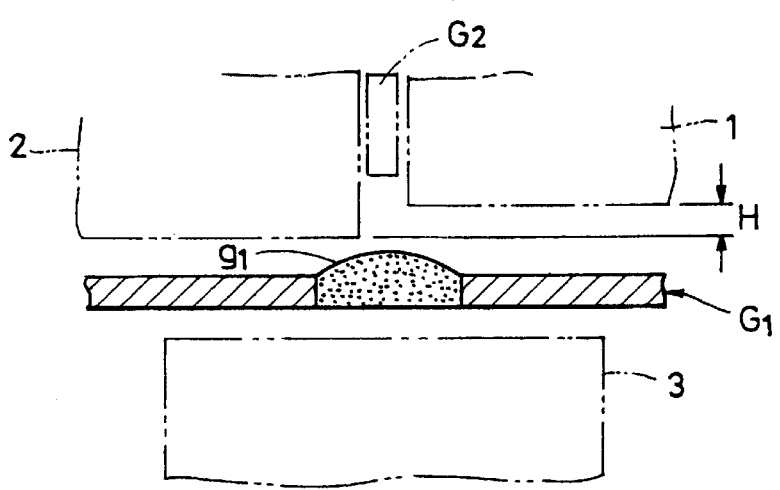

SEALING STRUCTURE OF A JOINT FOR THREE MEMBERS

FIELD OF THE INVENTION

The present invention relates to an improvement of a sealing structure of a joint for three members, at which three members butt against each other and a joint therefor has a shape of T.

DESCRIPTION OF THE PRIOR ART

Concerning the sealing structure of a joint for three members, JP-A-Hei 10-231935 discloses a sealing structure of a joint for three members, at which a cylinder block (second member) is jointed to a cylinder head (first member) in a motor and a timing cover (third member) is jointed to end surfaces of the first two members.

The sealing structure of a joint for three members is characterized in that liquid gasket product is put between the end surfaces of the first and second members and the third member, that a plate-shaped gasket is disposed between the first and the second members, and that the sealing property is improved by suppressing bulge-out of the liquid gasket product from a T-shaped joint portion of the three members owing to a protruding portion formed on an end surface of the gasket.

In the sealing structure of a joint for three members described above only the liquid gasket product serves as sealing material used on the third member side.

That is, it is assumed that seal outside of the T-shaped portion relies also on the liquid gasket.

For example, in case where an oil inlet and outlet section is in the joint portion of the third member, depending on the construction of the motor, since the liquid gasket is unsuitable for high pression seal (because of blow-off), it is necessary to dispose separately a rubber O-ring.

Further, although the liquid gasket is an excellent material for filling a gap having a not plain shape such as a T-shape, it has an inconvenience that utilization environments or conditions outside of the T-shaped portion are fairly restricted.

SUMMARY OF THE INVENTION

The present invention has been made in order to overcome the drawback of the sealing structure of a joint for three members disclosed in the publication and a main object thereof is to provide a sealing structure, which can be used for a joint for three members, without using any liquid gasket outside of the T-shaped portion.

In order to achieve the above object, the present invention is characterized in that in a sealing structure of a joint for three members, in which a second member and a third member are butted against a first member in common so that a joint portion has a T-shape, at least one plate-shaped gasket, in which rubber layers are formed on two surfaces of a metal plate, is disposed at least between surfaces to be jointed where the second and the third member are butted against the first member in common and an opening is formed in the plate-shaped gasket at a portion, which is opposite to a T-shaped portion, the opening being filled with a liquid gasket sealing the T-shaped portion.

BRIEF DESCRIPTION OF THE DRAWINGS

FIG. 1(*a*) is a block diagram showing a mounted construction of a sealing structure of a joint for three members according to an embodiment of the,present invention;

FIG. 1(*b*) is a plan view of a plate-shaped gasket $G_1$ used in the sealing structure indicated in FIG. 1(*a*);

FIG. 2 is an enlarged cross-sectional view of the plate-shaped gasket $G_1$ along a line A—A in FIG. 1(*b*);

FIG. 5(*b*) is a plan view of a plate-shaped gasket $G_3$ used in the sealing structure indicated in FIG. 5(*a*);

DESCRIPTION OF THE PREFERRED EMBODIMENTS

Figure 3:
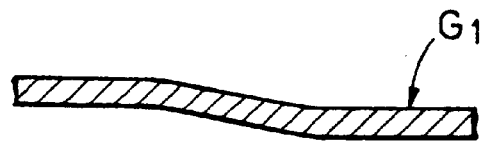
FIG. 3 is an enlarged cross-sectional view of the plate-shaped gasket $G_1$ along a line B—B in FIG. 1(*b*)

As a preferable mode of realization of the present invention, as indicated in FIGS. 1 to 3, in a sealing structure of a joint for three members, in which three members, i.e. a cylinder block 1, a cylinder head 2 and a timing cover 3 in a motor are butted against each other so that a joint portion has a T-shape, a plate-shaped gasket $G_1$ consisting of a metal plate on both the surfaces of which rubber layers are formed, is disposed between joint surfaces of the timing cover 3 as well as the cylinder block 1 and the cylinder head 2, against which the first two are butted in common, and an opening is formed in the plate-shaped gasket at a portion, which is opposite to a T-shaped portion, the opening being filled with paste-like liquid gasket $g_1$ sealing the T-shaped portion.

FIG. 1(*a*) is a diagram showing a mounted construction of a sealing structure of a joint for three members according to the present invention and FIG. 1(*b*) is a plan view of a plate-shaped gasket $G_1$. FIG. 2 is an enlarged cross-sectional view of the plate-shaped gasket $G_1$ along a line A—A, while FIG. 3 is an enlarged cross-sectional view thereof along a line B—B in FIG. 1(*b*).

In the figures reference numeral 1 is a cylinder block; 2 is a cylinder head; 3 is a timing cover; 4 is a head cover; and 5 is an oil pan in a motor. $G_1$ and $G_2$ represent plate-shaped gaskets, in each of which rubber layers are formed on both the surfaces of a metal plate. Hereinbelow items cited by reference numerals 1, 2, 3, 4 and 5 are called simply members.

A stainless steel plate (SUS), a cold pressed steel plate (SPCC), an aluminium plate, etc. can be used for the metal plate constituting the plate-shaped gasket $G_1$ or $G_2$. However it is not restricted thereto.

Silicone rubbers, nitril rubber, acryl rubber, fluorocarbon rubber, etc. can be used for the rubber layers. However other rubber materials may be arbitrarily selected to be used. Further, for the rubber layers, foam rubber layers, in which a number of independent bubbles are formed, can be used.

It is preferable that the metal plate is 0.2 to 0.3 mm thick and that the rubber layers are about 20 to 100 $\mu$m thick.

Opening portions such as cut-off portions, perforated portions, etc. are formed in the plate-shaped gasket $G_1$ at a portion, which is opposite to the T-shaped joint portion for the members 1, 2, 3, 4 and 5. These are filled with liquid gaskets $g_1$ $g_2$ and $g_3$ adjusted so as to be paste-like so that sealing portions by the liquid gaskets are formed.

The liquid gasket $g_1$ is used for sealing the T-shaped joint portion formed by the members 1, 2 and 3; the liquid gasket $g_2$ is used for sealing the T-shaped joint portion formed by the members 1, 5 and 3; and the liquid gasket $g_3$ is used for sealing the T-shaped joint portion formed by the members 2, 3 and 4. n represents a hole for a clamping bolt.

In case where the member 1 has a step H with respect to the member 2 in the T-shaped joint portion for the members 1, 2 and 3, as indicated in FIG. 2, a plate-shaped gasket having a bead fitted to that step is used.

Figure 4:
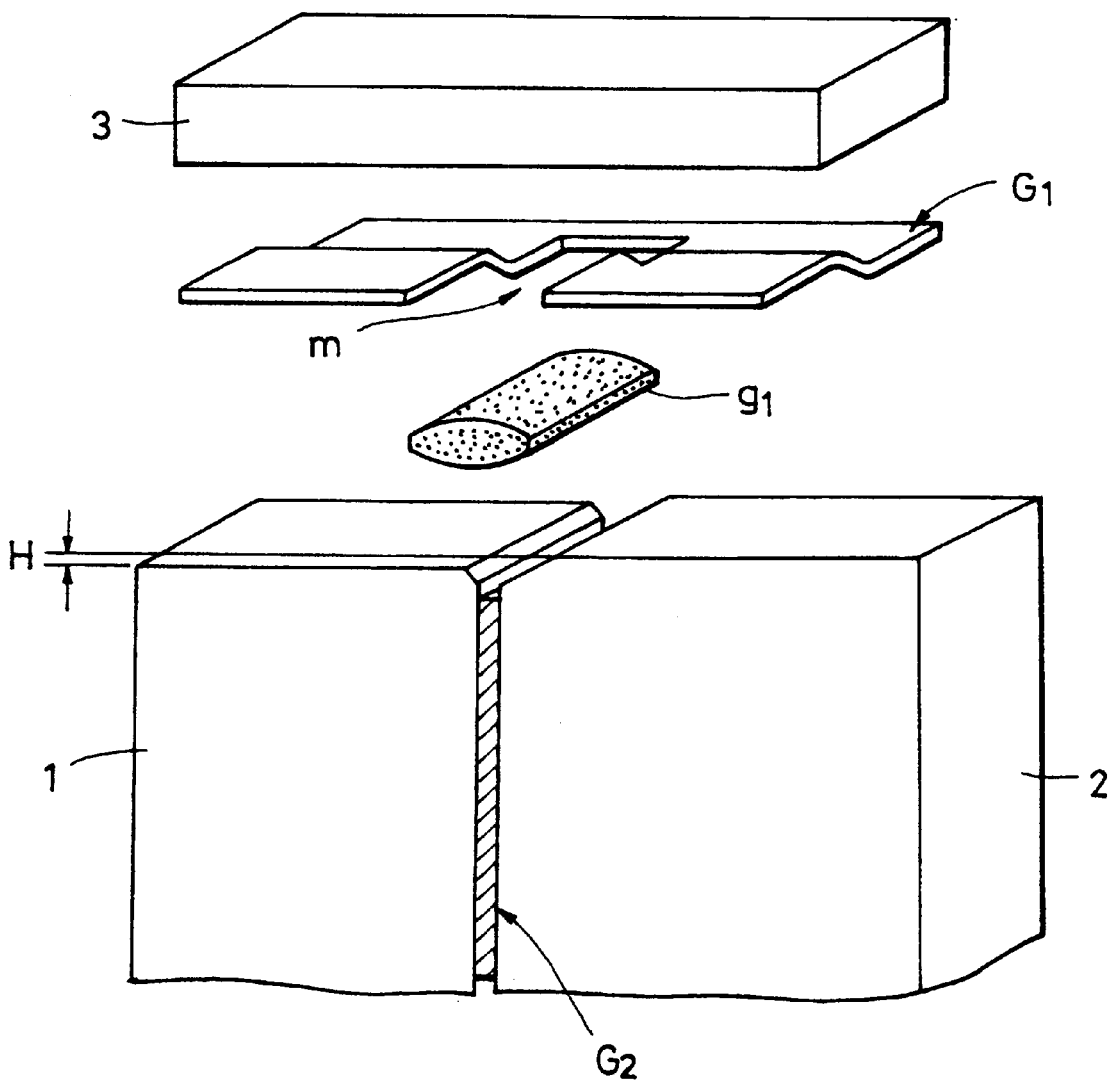
FIG. 4 is a perspective view showing a concrete example of construction of the sealing structure of a joint for three members.

FIG. 4 shows a concrete example of construction thereof. It has a construction substantially identical to that indicated in FIG. 2. That is, in case where the member 1 has a step H with respect to the member 2 in the T-shaped joint portion for the members 1, 2 and 3, a plate-shaped gasket $G_1$ having a half bead is used and a cut-off portion m is formed at a portion, which is opposite to the T-shaped joint portion, so that the cut-off portion m can be filled with paste-like liquid gasket $g_1$.

Figure 5A:
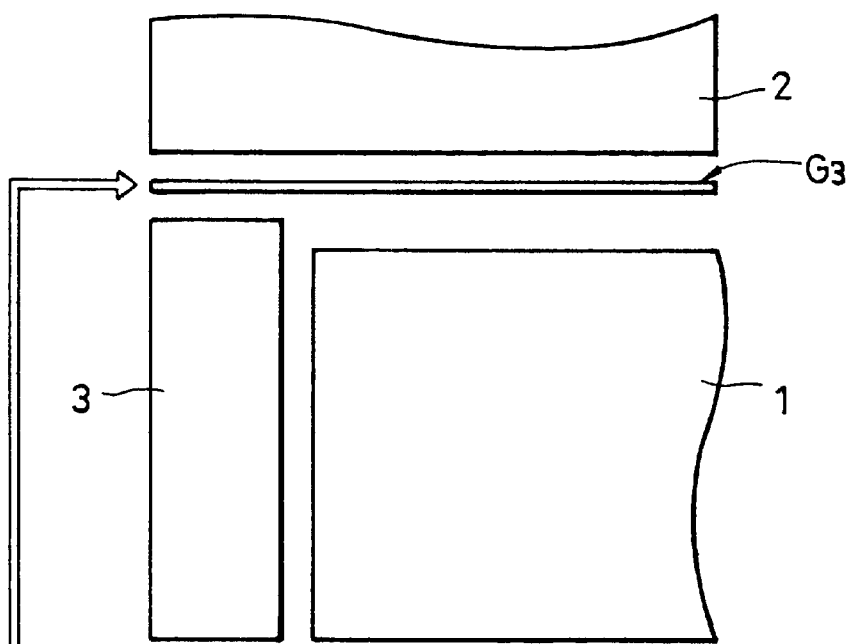
FIG. 5(*a*) is a block diagram showing a mounted construction of a sealing structure of a joint for three members according to another embodiment of the present invention.
Figure 5B:
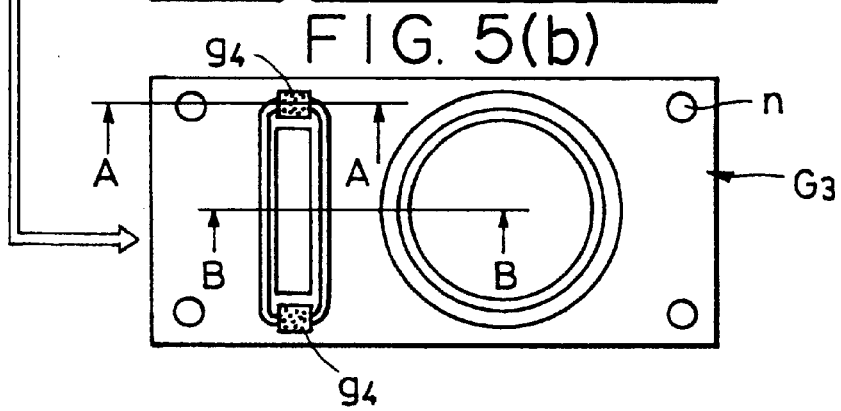

FIG. 5(a) is a diagram showing a mounted construction of another sealing structure of a joint for three members according to the present invention and FIG. 5(b) shows a gasket $G_3$ used therein.

Figure 6:
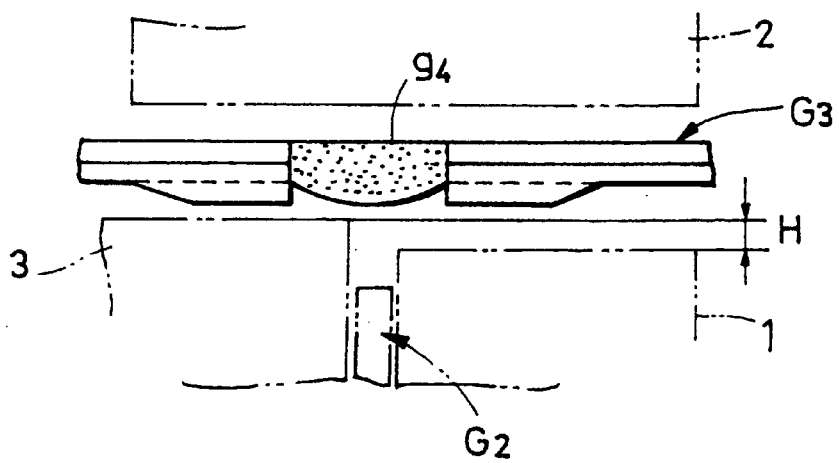
FIG. 6 is an enlarged cross-sectional view of the plate-shaped gasket $G_3$ along a line A—A in FIG. 5(*b*)
Figure 7:
FIG. 7 is an enlarged cross-sectional view of the plate-shaped gasket $G_3$ along a line B—B in FIG. 5(*b*)

FIG. 6 is an enlarged cross-sectional view of the gasket $G_3$ along a line A—A, while FIG. 7 is an enlarged cross-sectional view thereof along a line B—B in FIG. 5(b).

In the figures, the member 1 is a cylinder block; the member 2 is a cylinder head; the member 3 is a timing cover; $G_3$ is a plate-shaped gasket; and $g_4$ is a paste-like liquid gasket.

Since the member 1 has a step H with respect to the member 3 also in the present example of construction, it is so constructed that a plate-shaped gasket $G_3$ having a bead is used and that the cut-off portion is filled with the liquid gasket $g_4$.

Figure 8:
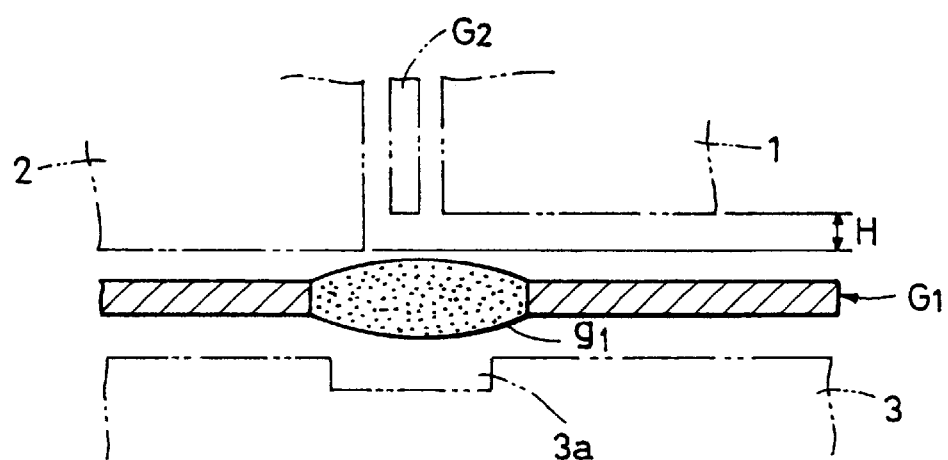
FIG. 8 is a perspective view showing another example of construction of the sealing structure of a joint for three members.

FIG. 8 shows an example of construction, in which the sealing structure for three members indicated in FIG. 2 has an improved sealing property in the T-shaped portion owing to a liquid gasket pool 3a formed in the member 3.

Figure 9:
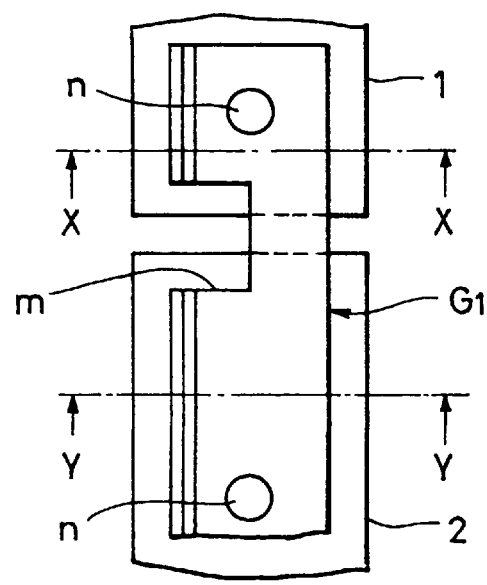
FIG. 9 is a plan view showing a state where a joint portion is sealed by using a plate-shaped gasket.
Figure 10:
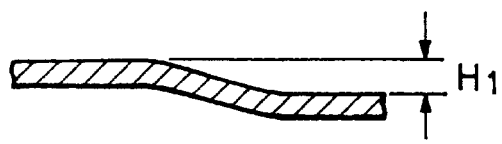
FIG. 10 is an enlarged cross-sectional view of the plate-shaped gasket along a line X—X in FIG. 9.
Figure 11:
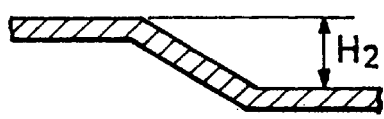
FIG. 11 is an enlarged cross-sectional view of the plate-shaped gasket along a line Y—Y in FIG. 9.

FIGS. 9 to 11 show still another example of construction, in which beads of plate-shaped gaskets are fitted according to steps between different members.

FIG. 9 shows an example of construction, a plate-shaped gasket $G_1$ is disposed on the members 1 and 2 having different steps. FIG. 10 is an enlarged cross-sectional view of the plate-shaped gasket along a line X—X, while FIG. 11 is an enlarged cross-sectional view thereof along a line Y—Y in FIG. 9.

In the present example of construction, balance in superficial pressure on the members 1 and 2 is improved by varying half beads therefore in the height, in case where the step $H_2$ for the member 2 is greater than the step $H_1$ for the member 1, viewed from the plate-shaped gasket $G_1$.

Figure 12:
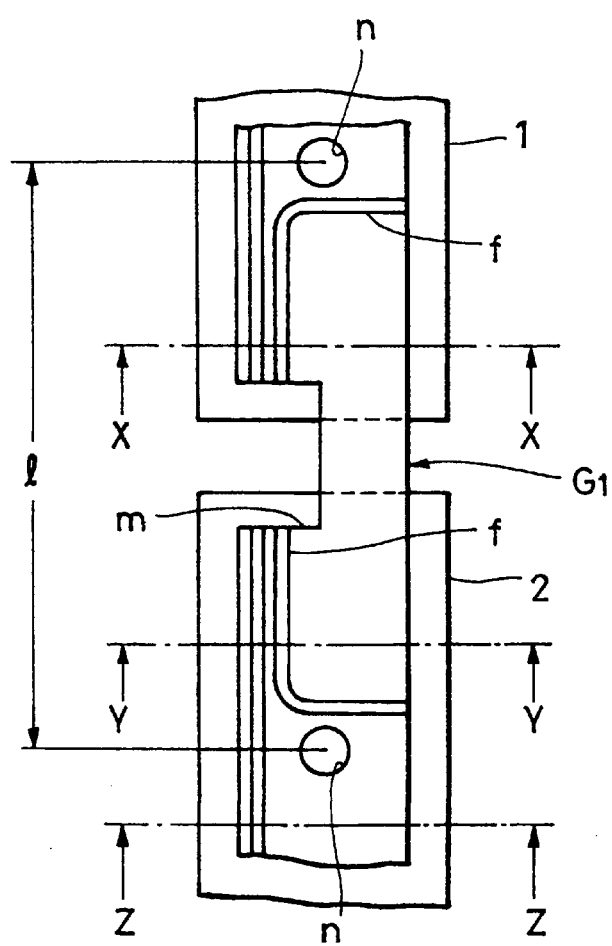
FIG. 12 is a plan view showing another example where a joint portion is sealed by using a plate-shaped gasket.
Figure 13:
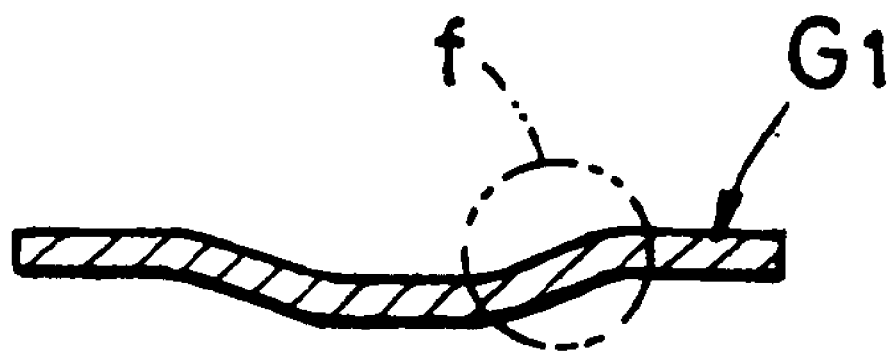
FIG. 13 is an enlarged cross-sectional view of the plate-shaped gasket along a line X—X or Y—Y in FIG. 12.
Figure 14:
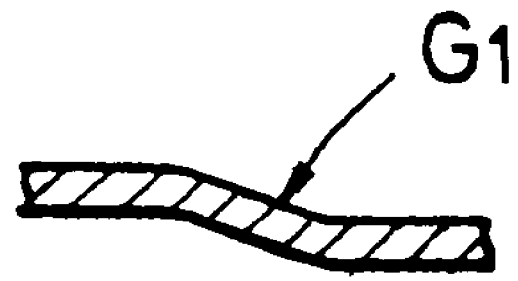
FIG. 14 is an enlarged cross-sectional view of the plate-shaped gasket along a line Z—Z in FIG. 12.

FIGS. 12 to 14 show still another example of construction, in which beads of a plate-shaped gasket having a long bolt pitch are fitted, depending on steps of the different members.

FIG. 12 shows an example of construction, in which a plate-shaped gasket $G_1$ is disposed on the members 1 and 2 having different steps, representing a distance between two bolt holes n. FIG. 13 is an enlarged cross-sectional view of the plate-shaped gasket along a line X—X or Y—Y, while FIG. 14 is an enlarged cross-sectional view thereof along a line Z—Z in FIG. 12.

The present example of construction shows a construction, in which balance in superficial pressure is improved by disposing a counterbead (extra bead) f apart from the half bead on the plate-shaped gasket $G_1$.

As described in detail in the above, according to the present invention, since a sealing structure of a joint for three members is constructed by using liquid gasket for sealing a T-shaped portion and at least one plate-shaped gasket, in which rubber layers are formed on both the surfaces of a metal plate for sealing other joint surfaces, following effects can be obtained.

1) Since the liquid gasket is used only on the T-shaped portion in the joint portion for three members, drawbacks such as function loss of other parts, etc. due to application tact compression or bulge-out of the liquid gasket can be significantly reduced.

2) The sealing property can be maintained also for great steps or gaps, which any conventional gasket made of rubber or any gasket having beads formed by printing on a joint sheet base plate cannot deal with.

3) The liquid gasket has a property to be easily broken, if itself is thin. On the contrary, since the plate-shaped gasket itself is thick, it is suppressed that the liquid gasket itself is broken.

4) Since the liquid gasket is strongly adhered to an end surface (metal part) of the plate-shaped gasket, a sealing property at contact surfaces can be satisfactorily maintained and at the same time it is possible to provide gaskets capable of being used most widely by using liquid gaskets, which can follow any form such as steps or gaps on the contact surfaces, together therewith.

5) Since plate-shaped gaskets, in each of which rubber layers are formed on a metal plate, are used, it is possible to vary liquid gasket pools by varying the thickness thereof and to increase freedom for taking measures to deal with steps or gaps (depth). That is, since it is possible to increase design freedom, a sealing structure having a good balance in superficial pressure can be obtained.

What is claimed is:

1. A sealing structure at a T-shaped joint fined by first, second and third members positioned such hat said second and third members butt against said first member to form at a juncture of the abutments said T-shaped joint, wherein each of said first, second and third members have oppositely facing joint surfaces adjacent said T-shaped joint, said sealing structure comprising:

at least one plate-shaped gasket configured for disposal disposed between said joint surfaces of said first, said second and said third members in an area of said T-shaped joint;

said at least one plate-shaped gasket including a metal plate having first and second surfaces, wherein first and second rubber layers are formed on said first and second surfaces of said metal plate and configured to mate with a respective one of said oppositely facing joint surfaces; and said at least one plate-shaped gasket having an opening opposing the juncture, wherein said opening is filled with a liquid gasket configured to mate with each of said oppositely facing joint surfaces at said juncture to effect a sealing of said T-shaped joint.

2. A sealing structure according to claim 1, wherein said first and second rubber layers of said at least one plate-shaped gasket are first and second foam rubber layers.

3. A sealing structure according to claim 1, wherein said at least one gasket opening is a cut-off portion or a perforated portion.

4. A sealing structure according to claim 1, wherein a step is formed in the joint surface of one of said second and third members adjacent the T-shaped joint; and said at least one plate-shaped gasket has a bead fitted to said step.

5. A sealing structure according to claim 4, wherein said at least one plate-shaped gasket includes a counterbead.

6. A sealing structure according to claim 1, wherein a liquid gasket pool is formed in said first member and is positioned opposite to said opening.

7. A sealing structure according to claim 1, wherein said metal plate is 0.2 to 0.3 mm thick and said first and second rubber layers are 20 to 100 $\mu$m thick.

8. A sealing structure according to claim 1, wherein at least one additional plate-shaped gasket is positioned between said second and third members.

9. A sealing structure at a T-shaped joint defined by first, second and third members positioned such that said second and third members butt against said first member to form at a juncture of the abutments said T-shaped joint, wherein each of said first, second and third members have oppositely facing primary joint surfaces adjacent said T-shaped joint and each of said second and third members have oppositely facing secondary joint surfaces adjacent said T-shaped joint, said sealing structure comprising:

at least one plate-shaped gasket configured for disposal between said primary joint surfaces of said first, second and third members and said secondary joint surfaces of said second and third members;

said at least one plate-shaped gasket including a metal plate having first and second surfaces, wherein first and second rubber layers are formed on said first and second surfaces of said metal plate; and said at least one plate-shaped gasket having an opening opposing the juncture, wherein said opening is filled with a liquid gasket configured to mate with said primary joint surfaces at said juncture to effect a sealing of said T-shaped joint.

10. A sealing structure according to claim 9, wherein said at least one plate-shaped gasket includes a first plate-shaped gasket positioned between the primary joint surfaces of said first, second and third members and a second, separate, plate-shaped gasket positioned between said secondary joint surfaces of said second and third members.

11. A sealing structure according to claim 10, wherein a step is formed in the primary joint surface of one of said second and third members adjacent the T-shaped joint; and said first plate-shaped gasket has a bead fitted to said step.

12. A sealing structure according to claim 9, wherein said first and second rubber layers of said at least one plate-shaped gasket are first and second foam rubber layers.

13. A sealing structure according to claim 9, wherein said at least one gasket opening is a cut-off portion or a perforated portion.

* * * * *